United States Patent
Graham et al.

(10) Patent No.: US 9,734,180 B1
(45) Date of Patent: Aug. 15, 2017

(54) OBJECT METADATA QUERY WITH SECONDARY INDEXES

(71) Applicant: EMC Corporation, Hopkinton, MA (US)

(72) Inventors: Stephen G. Graham, Chapel Hill, NC (US); Shashwat Srivastav, Seattle, WA (US); Sriram Sankaran, Redmond, WA (US); Vishrut Shah, Redmond, WA (US); Qi Zhang, Redmond, WA (US); Jun Luo, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 279 days.

(21) Appl. No.: 14/501,904

(22) Filed: Sep. 30, 2014

(51) Int. Cl.
*G06F 17/30* (2006.01)

(52) U.S. Cl.
CPC .. *G06F 17/30336* (2013.01); *G06F 17/30463* (2013.01)

(58) Field of Classification Search
None
See application file for complete search history.

(56) References Cited

U.S. PATENT DOCUMENTS

| | | | |
|---|---|---|---|
| 2003/0172059 A1* | 9/2003 | Andrei | G06F 17/30454 |
| 2004/0098371 A1* | 5/2004 | Bayliss | G06F 17/30545 |
| 2009/0187573 A1 | 7/2009 | Johnston et al. | |
| 2010/0106672 A1 | 4/2010 | Robson et al. | |
| 2013/0041872 A1 | 2/2013 | Aizman et al. | |
| 2014/0040286 A1 | 2/2014 | Bane et al. | |
| 2015/0095308 A1 | 4/2015 | Kornacker et al. | |

OTHER PUBLICATIONS

EMC Corporation; "ViPR 2.1—Use the ViPR Object Services;" Jan. 2014; 10 Pages; http://www.emc.com/techpubs/vipr/ds_use_object_services-2.htm.
EMC Corporation; "ViPR 2.1—ViPR S3 Object Service API Support;" Jan. 2014; 8 Pages; http://www.emc.com/techpubs/vipr/ds_s3_supported_features-t.htm.
EMC Corporation; "ViPR EMC Atmos Object Service API Support;" Jan. 2014; 7 Pages; http://www.emc.com/techpubs/vipr/ds_atmos_supported_features-1.htm.
EMC Corporation; "ViPR 2.1—ViPR OpenStack Swift Object Service API Support;" Jan. 2014; 5 Pages; http://www.emc.com/techpubs/vipr/ds_swift_supported_features-2.htm.
(Continued)

*Primary Examiner* — Syed Hasan
(74) *Attorney, Agent, or Firm* — Daly, Crowley Mofford & Durkee, LLP (57) ABSTRACT

An object storage system having object metadata query capability. Clients can pose queries to the object system in a high-level, declarative language. A query is evaluated against stored object metadata, and only objects satisfying the query's predicates are returned. The object storage system can evaluate alternative logical and physical query plans using a cost model. Queries can be posed using familiar REST-based APIs. The object storage system includes a distributed key-value store for secondary indexing of object metadata. A user can define secondary indexes considering the most common object access patterns.

16 Claims, 7 Drawing Sheets

(56) References Cited

OTHER PUBLICATIONS

EMC Corporation; "ViPR 2.1—Use S3 Applications with ViPR Object Storage;" Jan. 2014; 7 Pages; http://www.emc.com/techpubs/vipr/ds_use_s3_apps_with_vipr-2.htm.

EMC Corporation; "ViPR 2.1—Create Buckets to Support ViPR Data Services;" Jan. 2014; 11 Pages; http://www.emc.com/techpubs/vipr/ds_create_bucket-2.htm.

EMC Corporation; "Unleash the Value of Data with EMC ViPR Services;" Apr. 2014; 11 Pages.

Graham et al.; "Object Metadata Query with Secondary Indexes;" U.S. Pat. App. Filed on Sep. 30, 2014; 37 Pages.

Hadoop Wiki, "Overview of Sequence File;" Downloaded on Feb. 16, 2015; 3 Pages; https://wiki.apache.org/hadoop/SequenceFile.

Hadoop Wiki, "HDFS Architecture Guide;" Downloaded on Jan. 26, 2015; 8 Pages; http://hadoop.apache.org/docs/r1.0.4/hdfs_design.html.

EMC Corporation, "What is ViPR HDFS?;" Downloaded Jan. 26, 2015; 6 Pages; http://www.emc.com/techpubs/vipr/HDFS_overview-1.htm.

Graham et al., "Exposing Object Metadata to Distributed Processing Systems;" U.S. Appl. No. 14/674,314, filed Mar. 31, 2015; 44 Pages.

Graham et al., "Object Metadata Query With Distributed Processing Systems;" U.S. Appl. No. 14/674,324, filed Mar. 31, 2015; 44 Pages.

U.S. Non-Final Office Action dated Nov. 30, 2016 for U.S. Appl. No. 14/501,891; 12 Pages.

Response to U.S. Non-Final Office Action dated Nov. 30, 2016 for U.S. Appl. No. 14/501,891; Response filed on Feb. 28, 2017; 8 Pages.

U.S. Notice of Allowance dated May 24, 2017 corresponding to U.S. Appl. No. 14/501,891; 7 Pages.

U.S. Non-Final Office Action dated Jun. 2, 2017 for U.S. Appl. No. 14/674,314; 29 Pages.

* cited by examiner

OBJECT METADATA QUERY WITH SECONDARY INDEXES

BACKGROUND

Currently available object storage systems include Amazon S3, Red Hat Ceph, Open Stack Swift, EMC's Atmos, and EMC's ViPR Object Data Service. Such systems may provide scale-out mechanisms for users to store and retrieve object data and associated metadata. These systems typically provide REST-based application programming interfaces (APIs) to insert, update, delete, and retrieve objects. In general, these systems do not provide query capabilities, making it difficult to build applications that query and retrieve objects therefrom. The current approach to solving this use case with object systems involves an application retrieving a superset of the desired objects and discarding those objects that do not meet the search criteria. This approach is resource intensive and inefficient for the object system's servers, the network, and the application.

SUMMARY

It is appreciated herein that it would be advantageous to provide a query mechanism within an object storage system itself, wherein clients can pose queries to the object system in a high-level, declarative language. A query is evaluated against stored object metadata, and only objects satisfying the query's predicates are returned. Secondary indexes, which may be stored within a distributed key-value store, can be defined by users considering the most common object access patterns.

Described herein is a system comprising an object store to store a plurality of objects and corresponding object metadata properties within storage devices, each of the objects having an object id and being associated with a bucket, each of the metadata properties having a key and an corresponding value; a secondary index to map ones of the object metadata properties to ones of the object ids; a query parser to receive a query from a query source and to parse the received query into a query parse tree, the received query being associated with a bucket id, the received query having a predicate involving one of the object metadata keys; a query executor to determine ones of the object ids (and other metadata properties) from the secondary index using the bucket id associated with the query and the object metadata keys involved in the query predicate, and to retrieve ones of the object metadata properties from the object store using the determined object ids to generate a query result set stream; and a query formatter to generate a response to the query source based upon the query result set stream.

In some embodiments, the system further comprises a query optimizer to generate candidate query plans, to evaluate the candidate query plans based upon a cost model, and to select one of the candidate query plans based upon the cost model evaluation, each of the candidate query plans being semantically equivalent to the received query. The query optimizer may generate at least one logical query plan according to the received query, and a plurality of physical query plans according to the logical query plan, wherein the selected query plan corresponds to one of the plurality of physical query plans. In certain embodiments, the selected query plan comprises a tree representation, wherein nodes of the tree representation correspond to operations, wherein the query executor executes the selected query plan by traversing the nodes of the tree representation and executing the corresponding operations. In various embodiments, the secondary index comprises a distributed key-value store. The query optimizer can utilizes statistical information about the secondary index computed from the distributed key-value store to evaluate the candidate query plans.

In certain embodiments, the system further comprises a request processor to receive an updated object and object metadata properties, to write the updated model and object metadata properties to the object store, and to update the secondary index based upon the updated object metadata properties. The object store and the secondary index can be updated atomically.

Also described herein is a method comprising receiving a query from a query source, the received query being associated with a bucket id and having a predicate involving an object metadata key; parsing the received query into a query parse tree; generating candidate query plans, each of the candidate query plans being semantically equivalent to the received query; selecting one of candidate query plans; determining object ids that satisfy the query predicate by retrieving object ids from a secondary index using the bucket id associated with the query and the object metadata keys involved in the query predicate; retrieving a plurality of object metadata from an object store using the determined object ids; and generating a response to the query source based upon the object ids and object metadata.

In various embodiments, selecting one of candidate query plans comprises evaluating the candidate query plans based upon a cost model and selecting one of candidate query plans based upon the cost model evaluation. The step of generating candidate query plans may include generating at least one logical query plans according to the received query and generating a plurality of physical query plans according to the logical query plan, wherein the selected query plan corresponds to one of the plurality of physical query plans. In some embodiments, generating a plurality of physical query plans comprises generating a tree representation, wherein nodes of the tree representation correspond to operations, the method further comprising traversing the nodes of the tree representation and executing the corresponding operations.

In some embodiments, retrieving object ids from a secondary index comprises retrieving rows from a distributed key-value store using the bucket id associated with the query and the object metadata keys involved in the query predicate. The step of evaluating the candidate query plans based upon a cost model may include utilizing statistical information about the secondary index computed from the distributed key-value store.

In certain embodiments, the method further comprises receiving a request to store updated object and object metadata properties; writing the updated model and object metadata properties to the object store; and updating the secondary index based upon the updated object metadata properties. The updates may occur atomically.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

The phrases "computer," "computing system," "computing environment," "processing platform," "data memory and storage system," and "data memory and storage system environment" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" can also refer to a storage array comprising one or more storage devices.

The term "memory" herein refers to any type of computer memory accessed by an application using memory access programming semantics, including, by way of example, dynamic random access memory (DRAM) and memory-mapped files.

Typically, reads or writes to underlying devices is done by an operating system (OS), not the application. As used herein, the term "storage" refers to any resource that is accessed by the application via input/output (I/O) device semantics such as read and write systems calls. In certain instances, the same physical hardware device could be accessed by the application as either memory or as storage.

The term "secondary index" is used herein to describe an indexing mechanism for properties of an object other than its primary identifier (e.g., the object's "primary key"). Secondary indexes can provide efficient access to data based on properties of the data other than its primary key.

Figure 1:
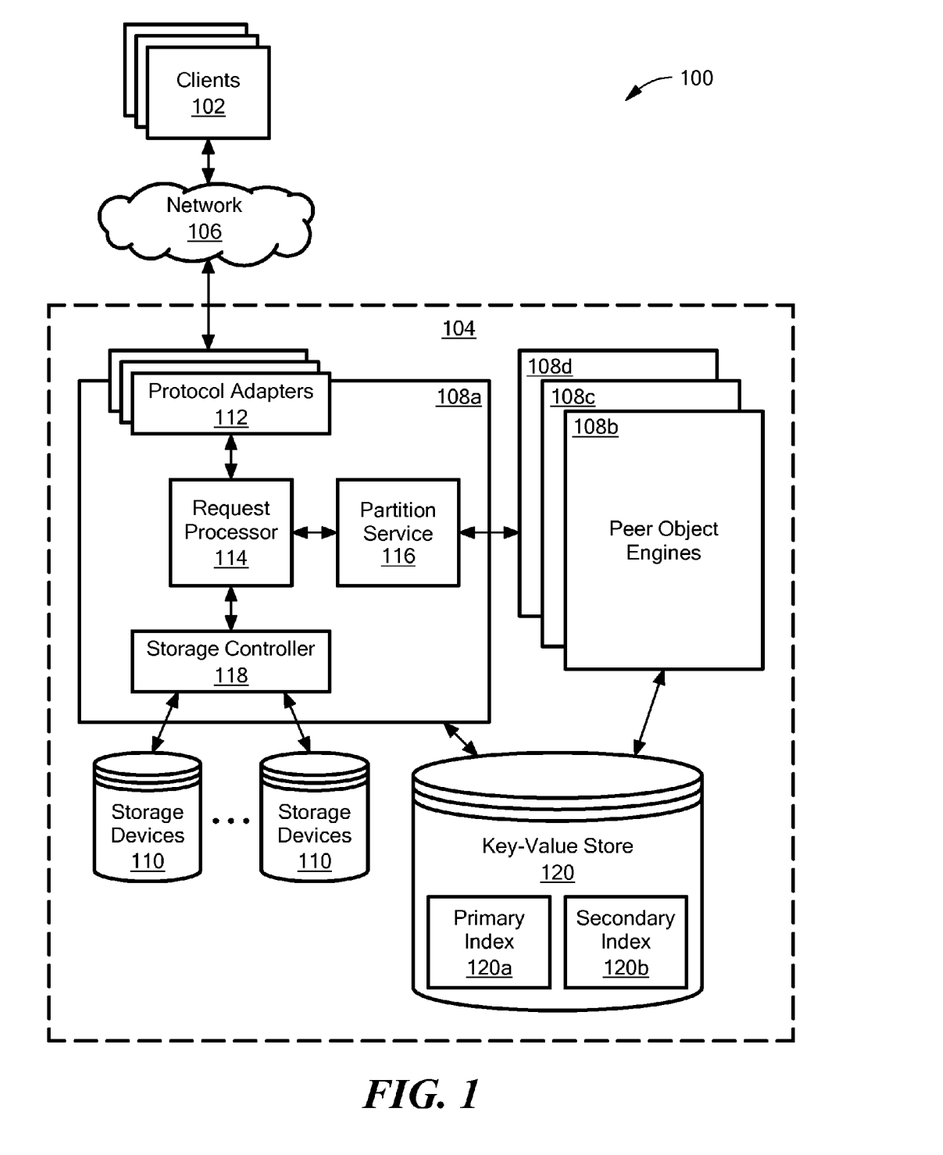
FIG. 1 is a diagram of an illustrative storage environment having an object storage system.

Referring to FIG. 1, an illustrative storage environment 100 comprises clients 102 operatively coupled to an object storage system 104 via a network 106. The clients 102 may correspond to hosts and/or user applications configured to execute thereon. In some embodiments, a client 102 corresponds to a web browser, a command-line application, or another type of user application concerned with object storage. The network 106 may be any known communication network or combination of networks including networks using protocols such as, but not limited to, Ethernet, Internet Protocol (IP), Transmission Control Protocol (TCP), wireless protocols, etc.

The object storage system 104 includes one or more object storage engines (or simply "storage engines") 108, with four storage engines 108a-108d shown in this example.

The object storage system 104 is capable of storing and retrieving object data and associated metadata. Objects can be uniquely identified within the system using an "object key" comprising one or more namespace identifiers and a unique "object id" within the identified namespace. In some embodiments, the namespace identifiers include a "tenant id" and a "bucket id," where the tenant id uniquely identifies a tenant (i.e., a customer, a user, or any other top-level entity) within the object storage system and the bucket id uniquely identifies a collection of objects (or "bucket") defined by and belonging to the tenant. The tenant, bucket, and object ids can be any suitable values, such as strings, numbers, or a combination thereof.

To scale processing and storage capabilities, the storage engines 108 can be distributed across multiple physical and/or virtual computing platforms, referred to herein as "data nodes" or more simply "nodes." In some embodiments, each storage engine 108 corresponds to a separate node. A storage engine 108 (or node) is responsible for managing a separate partition of object data, referred to as a "shard." Thus, object data may be read data in parallel from multiple storage devices and/or nodes, which can improve I/O performance. The storage engines 108 are operatively coupled to one or more storage devices 110. In some embodiments, different storage engines 108 are coupled to different storage devices 110. In certain embodiments, multiple storage devices 108 are coupled to a common storage device 110. Thus, a shard may correspond to a physical storage device and/or a logical storage device. The storage engines 108 can be interconnected using any suitable means, such as a local-area network (LAN) or a wide-area network (WAN). In certain embodiments, the nodes 108 communicate peer-peer over IPC using Google Protocol Buffers.

In various embodiments, the object storage system 104 includes a load balancer to receive requests from the clients 102, to select one of the storage engines 108 to process the request, and to forward the request thereto. Any suitable load balancing techniques may be used.

In general, each of the storage engines 108 is architecturally similar and, therefore, only one of the storage engines (i.e., storage engine 108a) is shown in detail in FIG. 1. The illustrative storage engine 108a includes one or more protocol adapters 112, a request processor 114, a partition service 116, and a storage controller 118, coupled as shown. The storage engine 108a supports one or more communication protocols ("protocols" for short) usable by the clients 102 to interact with the object storage system 104 (e.g., to read and write objects). The protocol adapters 112 include any suitable combination of hardware and software to implement these protocols. The illustrative storage engine 108a may comprise off-the shelf server hardware and/or software, e.g., a Windows server, a Sun Solaris server, an HP server, a Linux server, etc. In some embodiments, the storage engine 108 provides REST-based application programming interfaces (APIs) based on the S3 API from Amazon and/or the Swift API from OpenStack (thus, some of the protocol adapters 112 may correspond to REST-based APIs). It will be understood that these REST APIs generally provide at least the following commands: creating a bucket, retrieving, updating, and deleting a bucket by bucket id; retrieving a list of buckets; creating an object, retrieving, updating, and deleting an object by bucket id and object id; and retrieving a listing of objects within a bucket by bucket id (sometimes referred to as a "list bucket operation"). In some embodiments, the create, retrieve, update, and delete operations are specified via an HTTP request method (e.g., "POST" would indicate a create whereas a "PUT" would indicate an update, GET indicates retrieval). Advantageously, existing object REST access protocols (e.g., S3 and Swift), which support scalable client access to object data, can be augmented to allow clients 102 to pose sophisticated queries over object metadata, as described further below in conjunction with FIG. 3.

In various embodiments, the object storage system 104 provides a programming language-based API by which command line tools or other user applications can interact with the object storage system 104.

The object storage system 104 shards object data and object data across multiple shards (i.e., partitions of storage devices 110 attached to nodes) and may store multiple replicas of object data/metadata to improve fault tolerance and data availability. The partition service 116 maintains a mapping between object keys and storage locations that contain portions of corresponding object data. The partition service 116 includes any suitable combination of hardware and software to maintain this mapping.

In various embodiments, object storage system 104 includes a distributed key-value store 120. Those skilled in the art will understand that distributed key-value stores provide high performance, massive scalability, and fault-tolerance and typically do not impose a schema on the stored data. In various embodiments, the key-value store 120 is a commercial off-the-shelf (COTS) key-value store such as Riak, MemcacheDB, or Voldemort. It will also be understood that some key-value stores provide not only the ability to retrieve a value for a single key (referred to herein as a "GET" operation), but also the ability to retrieve key-value pairs for a range of a keys that match a given prefix (referred to herein as a "PREFIX-GET" operation). In some embodiments, the key-value store includes a B+Tree implementation, a journal, and an in memory cache.

The distributed key-value store 120 may include a "primary index" 120a for efficiently storing and retrieving object data and metadata. Thus, for example, the primary index 120a may include the mapping between object keys and storage locations utilized by the partitions service 116. The distributed key-value store 120 may also include a "secondary index" 120b for efficient object retrieval based on properties of object metadata itself. The use of a secondary index 120 can make certain object retrieval patterns relatively more efficient, as described further below. In other embodiments, the primary and secondary indexes 120a, 120b are provided within separate key-value stores.

As mentioned above, objects can be uniquely identified within the object storage system 104 from the combination of tenant id, bucket id, and object id. In a particular embodiment, the primary index 120a uses the key format "<tenant id>.<bucket id>.<object id>." Information about all objects within a bucket can be retrieved by issuing a PREFIX-GET operation on the primary index 120a using the prefix "<tenant id>.<bucket id>." This technique can be used to efficiently implement a "bucket scan" operation, as discussed below. It will be appreciated that other key formats, which may also allow for efficiently bucket scans, can be used.

The request processor 114 includes any suitable combination of hardware and software to process client requests. For requests that identify a particular object (e.g., an object read or write request), the request processor 114 can use the partition service 116 to determine if the request should be handled locally (i.e., if the entirety of the object's data is accessible by the current node) or if it must be delegated to another node 108. If the request can be handled locally, the request processor 114 issues read/write commands to the storage controller 118, which may be a storage-specific device driver (e.g., a Linux block device driver). Otherwise, the request is forwarded to one or more peer nodes 108b-108d storing the object data.

In various embodiments, the object storage system 104 is based on ViPR Object Data Services by EMC Corporation, a massively scale-out, geo-replicated object store. It is understood that any suitable object storage system can be used. ViPR Object is compatible with file-based storage devices 110, such as EMC Isilon® and VNX®, and NetApp® storage systems.

In operation, a client 102 issues API commands to the object storage system 104. The commands may be specified via HTTP requests according a REST-based API. A command is forwarded to one or more peer storage engines 108 as needed. For example, if the command is an object read command comprising an object key, the request processor 114 (using the partition service 116) determines the location of the object's data and forwards the request as needed. The appropriate storage engines 108 would read the object's data from a storage device 118, and the object data would be returned to the client 102. As another example, if the request comprises an object metadata query as described below with FIG. 3, the request processor 114 may parse, analyze, and execute the query to resolve one or more object keys. In turn, the request processor 114 issues object read commands to the local storage controller 118 and/or issues object read commands to peer nodes 108 containing the resolved object keys. In turn, the request processor aggregates the read object data/metadata and returns it to the client 102.

Figure 2:
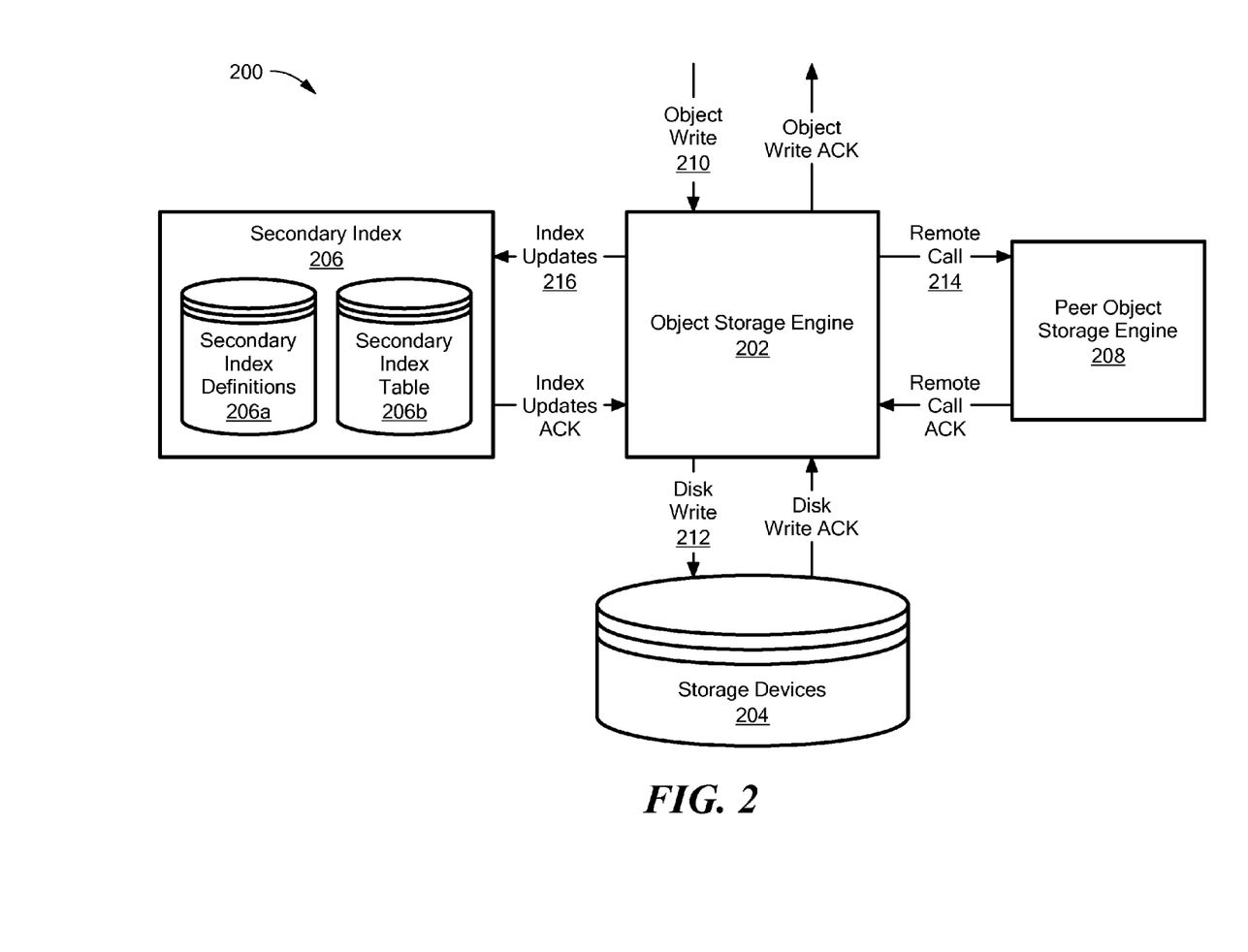
FIG. 2 is a diagram of an illustrative storage environment having an object storage system and a secondary index.

Referring to FIG. 2, an illustrative object storage system 200, which may be the same as or similar to storage system 104 of FIG. 1, includes an object storage engine 202, storage devices 204, and a secondary index 206. The storage system 200 may also include peer object storage engines 208.

The secondary index 206 comprises secondary index definitions 206a and a secondary index table 206b. The index definitions 206a include information about any secondary indexes that have been created (e.g., by a user), including the index name, the indexed metadata keys, and any cached metadata keys. The index table 206b maintains a mapping between one or more indexed object metadata properties (i.e., metadata key-value pairs included within the key) and one or more cached object metadata properties (i.e., metadata properties, including the object id, included within the value), wherein each row in the table corresponds to a stored object. It will be appreciate that the use of secondary indexes can make certain object retrieval patterns much more efficient. In various embodiments, the secondary index table 206b is stored within a distributed key-value store (e.g., key-value store 120 of FIG. 1). The index definitions 206a could be stored within the same key-value store, a different key value store, a relational database, in memory data structure, configuration files, or using any other suitable mechanism.

Secondary indexes can be defined (i.e., created and updated) by a user, such as an application developer or database engineer, based on an application's data access patterns. Secondary indexes are defined on a specified bucket owned by a particular tenant. A user can define an arbitrary number of secondary indexes on a given bucket, although it will be understood that the number and type of secondary indexes presents a tradeoff between read and write performance. A secondary index can be declared by a developer using a variety of means, including a REST-based API, a programming language-based API, and/or an interactive command line application (e.g., a "shell").

TABLE 1

Create Secondary Index Example

POST http://Employee.someNamespace.OrgTenant.org/index
<create_index>
  CREATE INDEX employee-city-age (city, age) CACHE (name, empID)
</create_index>

TABLE 1 illustrates a request to create an index using a REST-based API. The request includes a "CREATE INDEX" declaration having index name "employee-city-age," index metadata keys "city" and "age," and cache metadata keys "name" and "empID." As specified via the REST URL, the index is declared within the "Employee" bucket associated with the tenant "OrgTenant.org." It will appreciated that the index is a composite-type index because it includes multiple metadata keys ("city" and "age"). The cache metadata keys, declared using the "CACHE" keyword, correspond to metadata properties that would be cached (i.e., duplicated to potentially improve performance) within secondary index table 206b. In general, an index declaration includes one or more index metadata keys and zero or more cache metadata keys.

The successful processing of the create index request is the establishment of a data structure within the object system (more specifically the index definitions 206a) such that when an object is inserted, updated, or deleted in the bucket, the secondary index table 206b can be correspondingly updated. When an object is inserted, a new key-value entry is entered into the secondary index table in the object system. For example, using the example of TABLE 1, the values of an object's "city" and "age" metadata properties would be combined with the tenant id, the bucket id, the index name, and the object id to form the key. The value is a combination of the object's name and any metadata properties declared in the CREATE INDEX statement (e.g., "name" and "empID" in the example of TABLE 1). When an object is updated, if that update affects any of the metadata properties in the secondary index, the key-value entry in the secondary index table 206b is modified to reflect those changes. When an object is deleted, the corresponding key-value pair is removed from the secondary index table 206b. A user can declare multiple secondary indexes on a given bucket, in which case each object insert/update and delete operation may affect multiple key-value entries in the secondary index table 206b, one per secondary index declared on the bucket.

TABLE 2

| Key | Value |
|---|---|
| OrgTenant.Employee.employee-city-age.city.Seattle.age.49.ObjectA | ObjectA.name.Jane Smith. empID.123 |
| OrgTenant.Employee.employee-city-age.city.Boston.age.23.ObjectB | ObjectB.name.Fred Jones. empID.456 |

TABLE 2 is an example showing the result of multiple object insert operations on the secondary index created in TABLE 1. More specifically, the first row corresponds to an object having object id "ObjectA" with metadata properties: city=Seattle, age=49, name=Jane Smith, and empID=123 (other metadata properties may also be defined, but are not duplicated in this illustrative secondary index). Likewise, the second row corresponds to an object having object id "ObjectB" with metadata properties: city=Boston, age=23, name=Fred Jones, and empID=456. It should be appreciated that, using the key-value store's PREFIX-GET operation, the object storage system 200 can efficiently find the object ids of employee's within a given city, or employee's within a given city and of a certain age. Moreover, because the "name" and "empID" metadata properties are cached as part of the "employee-city-age" index, these values would be retrieved as part of the same PREFIX-GET operation. Because the secondary index information is accessible using a B+Tree format, certain operations, such as retrieving all objects in the Employee bucket where the value of the "city" property is "Seattle" can be executed in O(log N) time.

On object insert, update and delete operations, the primary object data must be processed in the object system, and the secondary index table 206b may need to be updated to maintain consistency. Ideally, these changes should occur within a transaction so that the object's primary data and metadata together with updates to the secondary index are changed atomically (i.e., either all changes are persisted or, in the case of an error, none of the changes are persisted). In various embodiments, the secondary index update mechanism can be integrated with the object insert/update/delete transaction system already in ViPR Object Data Service.

FIG. 2 also illustrates a technique for updating primary object data along with secondary index table 206b. At step 210, an object write request is received from a client (not shown) at an object storage engine 202 (i.e., any data node) and, at step 212, the data is written to disk. The ownership of the object is determined and, at step 214, a remote call is sent to the owning data node (e.g., peer object storage engine 208) to update the Journal, Memory Table, etc. to reflect the location of the write. The remote call can utilize inter-process communication (IPC), a remote procedure call (RPC), a message-passing technique, or any other suitable inter-process and/or inter-host communication technique.

At step 216, the object storage engine 202 uses secondary index definitions 206a to determine which, if any, secondary indexes may need to be updated based upon the written object's tenant id, bucket id, and metadata properties. For each secondary index defined on the bucket, the object storage engine 202 potentially updates entries in the secondary index table 206b. In the case of an object create operation, new key-value pair entries may be inserted into the secondary index table 206b if the object has the metadata properties specified in any of the bucket secondary indexes (specified either as indexed metadata or cached metadata). For update operations, if the update operation modified metadata properties involved in any secondary index, key-value pairs are updated. For a delete operation, any associated key-value pairs in the secondary index table 206b can be deleted. Multiple secondary index operations can occur in parallel to reduce latency.

The object storage engine 202 waits for the acknowledgements of success ("ACKs") for the disk write, remote call, and secondary index update steps 212-216 before returning an acknowledgement to the client. In general, if any of these steps fail, the system 202 guarantees that the entire operation fails, thus providing transaction semantics to the client.

Figure 3:
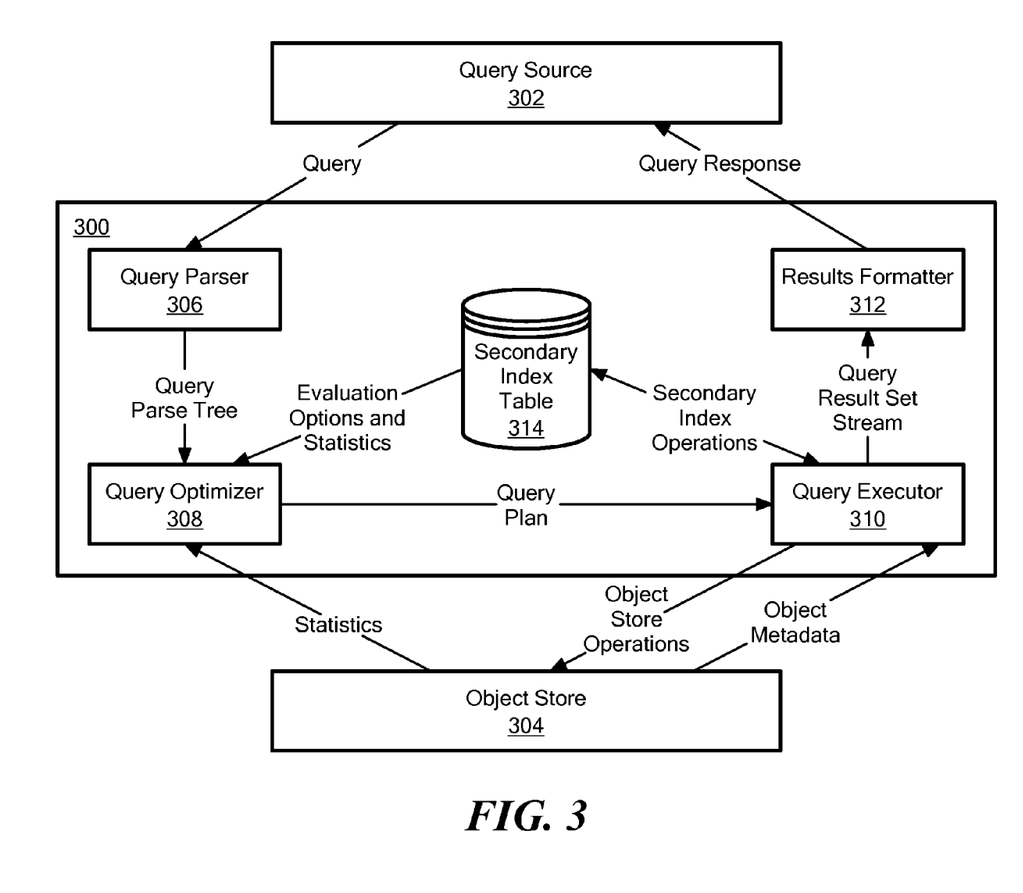
FIG. 3 is a block diagram of an illustrative object query service that could form part of the object storage systems of FIG. 1 or 2.

Referring to FIG. 3, an illustrative object query service 300 receives object metadata queries (or more simply "queries") from a query source 302, processes the query, and issues corresponding operations to an object store 304. The illustrative object query service (or more simply "query service") 300 includes a query parser 306, a query optimizer 308, a query executor 310, and a results formatter 312, operatively coupled as shown. The query service 300 also includes (or otherwise utilizes) a secondary index table 314.

In various embodiments, the query service 300 forms a part of the object storage systems 104 and/or 200 of FIGS. 1 and 2, respectively. More particularly, the query service 300 could form part of a request processor 114. Accordingly, the object store 304 may include the partition service 116, storage controller 118, and/or storage devices 110; and the query source 302 may correspond to a protocol adapter 112. In other embodiments, the query service 300 is provided separately from the query service 300 as an intermediate layer between clients 102 and the object storage system 104 (i.e., the object store 304 would correspond to the object storage system 104). Thus, the object store 304 may correspond to entire object storage system 104, and the query source 302 may correspond to a client 102. In various embodiments, the secondary index table 314 is the same as or similar to the secondary index table 216*b* of FIG. 2.

The query parser 306 receives an object metadata query (or more simply a "query") from the query source 302 and parses the query to generate a query parse tree. In certain embodiments, a query can be posed using a REST-based API, wherein the query is specified within a Hypertext Transfer Protocol (HTTP) request body or header. In some embodiments, a protocol adapter 112 (FIG. 1) extracts the query from the HTTP request. Thus, it will be appreciated that existing REST-based APIs, such as S3 and Swift, can be readily extended to support the various types of object metadata queries described herein. In certain embodiments, a protocol adapter 112 (FIG. 1) implements a programming language-based API and, thus, queries can be posed using an application, such as a command line shell.

An object metadata query can be expressed in a high-level query language modeled on Structured Query Language (SQL). The high-level language, referred to herein as the Object System Query Language (OSQL), is a predicate-based query capability to allow clients to declaratively specify what subset of the objects they are interested in retrieving, without having to specify how those objects are retrieved from the object store 304.

TABLE 3 shows the syntax of OSQL, according to some embodiments. As with SQL, ordering is assumed to be ascending ("ASC") unless explicitly specified as descending ("DESC").

TABLE 3

OSQL Syntax

SELECT(* | metadataKeyName (AS aliasName)? [, metadataKeyName (AS aliasName)?]*
  (FROM bucketName (AS bucketAlias)? )?
  (WHERE queryExpression)?
  (ORDER BY metadataKeyName (ASC | DESC)? [, metadataKeyName (ASC | DESC) ?]*])?

TABLE 4 illustrates an OSQL query posed using a REST-based API. In this example, the bucket id ("Employee") and tenant id ("OrgTenant") are specified within a POST URL, and the query is included within the POST body. Alternatively, the bucket id could be specified using a "FROM" clause. The illustrative query of TABLE 4 declares that the result set should include the "city," "age," and "name" metadata properties, along with object ids, for employees associated with the city of "Seattle" who are older than 25. The query also declares that the result set should be sorted by "name."

Table 4

TABLE 4

OSQL Query Example

POST http://Employee.someNamespace.OrgTenant.org/query
<query>
  SELECT Key AS ObjectID, city, age, name
  WHERE city = "Seattle"AND age > 25
  ORDER BY name
</query>

The query parser 306 can use conventional query parsing techniques to parse an object metadata query into a query parse tree. Those skilled in the art will understand how to adapt existing SQL parsers to parse and/or validate OSQL queries based on the above syntax descriptions. For syntactically correct queries, the result of the query parsing is a query parse tree that is passed to the query optimizer 308.

The query optimizer 308 determines the most efficient way to evaluate the query against objects in a specified bucket to generate the result set. The query optimizer 308 generates one or more query plans based on the query parse tree and evaluates those query plans according to a cost model, to select a plan to be executed. It will be appreciated that, because OSQL is a declarative language (i.e., clients specify what is to be queried but not how), the query optimizer 308 has freedom to consider query plans. This allows the query service 300 to select the "best" approach for translating the query into a set of steps that can be executed against the object store 304.

In some embodiments, the query optimizer 308 uses a four-part approach: (1) generate an initial "logical" query plan that reflects the semantics of the query (this step may be performed by the query parser 306, as described above); (2) use relational algebra rules to generate one or more logical query plans that represent semantically equivalent approaches to resolving the query; (3) use transformation rules to generate one or more "physical" query plans for each candidate logical query plan; and (4) evaluate the physical query plans based on a cost model to select the least cost alternative, which is submitted to the query executor 310 for execution.

As used herein, the term "logical query plan" refers to a representation of a query that satisfies the query's semantics without dictating how the query is executed. In contrast, a "physical" query plan is a query representation that specifies how the query should be executed. A logical query plan includes logical operators that do not necessarily correspond to processing performed by the query service 300 or the object storage 304 (referred to herein as "logical operators"), whereas a physical query plan includes operators that do correspond to processing performed by the query executor 310 and/or the object store 304 (sometimes referred to as "physical operations"). Although any suitable logical operators can be used, non-limiting examples include "Retrieve objects from bucket," "Filter," "Project," and "Sort." In various embodiments, the query service 300 uses tree representations for logical and/or physical query plans. In such representations, each node generally corresponds to a specified logical/physical operator.

Figure 4:
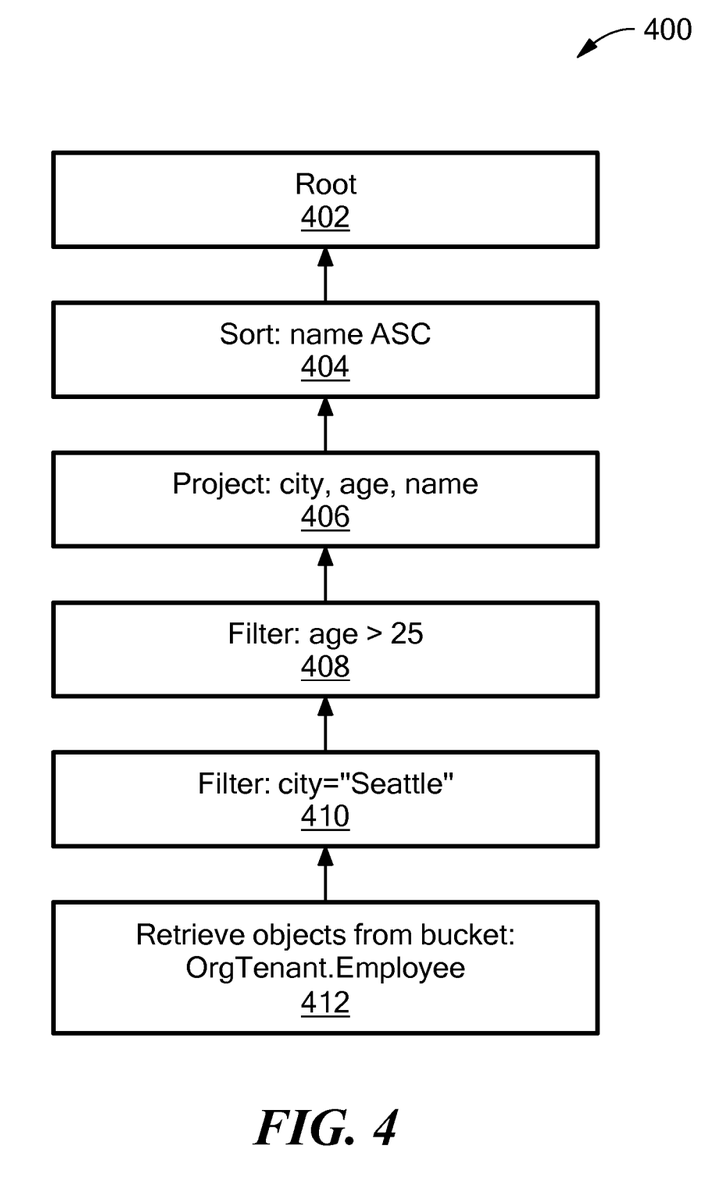
FIG. 4 is a diagram of an illustrative logical query plan.

An initial logical query plan can be derived from the query parse tree using any suitable strategy. One strategy for forming the initial logical query plan is illustrated in FIG. 4, which shows a logical query plan 400 corresponding to the OSQL query of TABLE 4. First, the tree representation 400 is initialized with root node 402. Next, a "Sort" operator node 404 is added based on information within the "ORDER" clause, if present. Next, a "Project" operator node 406 is added based on projection information within the "SELECT" clause. Next, "Filter" operator nodes 408 and 410 are added based on predicate information within the "WHERE" clause. Finally, a leaf node 412 is added using tenant/bucket information within the "FROM" clause (or using tenant/bucket information within the URL).

As the initial query plan is being formed, optimization can occur based on applying predicate logic rules to simplify and eliminate redundancy that may appear in the query. Existing heuristics and rules can be applied, allowing the query optimizer 308 to consider optimizations by rearranging the operators in a way that preserves query semantics.

The initial logical plan can serve as the basis for generating alternative logical query plans that also satisfy the semantics of the query submitted by the client. Any techniques known in the art, such as relational algebra transformation rules, may be used to generate alternative logical query plans. For example, referring to FIG. 4, alternative logical query plans could be derived from the initial logical query plan 400 by rearranging some of the steps, such as by swapping nodes 404 and 406 to perform the sort operation before the project operation. The initial and alternative logical query plans are collectively referred as the "candidate logical query plans."

The candidate logical query plans can be translated into physical query plans by mapping logical operators to "physical" operators defined within the query executor 310 and/or object store 304. In certain embodiments, the available physical operators are those shown in TABLE 5.

The query optimizer 308 uses any suitable strategy to transform a logical query plan into one or more physical query plans. For example, the query optimizer 308 can apply a set of transformation rules to the logical operators. A secondary index might be useful to make the retrieval of object metadata fields or evaluation of a predicate more efficient. This depends on the set of fields in the index, the sort order, and the metadata properties involved in the logical operation. The transformation rules are embodied in a physical plan generation strategy. In certain embodiments, the query optimizer 308 uses the "Strategy" software design pattern, allowing multiple strategies to be evaluated.

TABLE 5

| Physical Operator | Description | Implementation Example |
| --- | --- | --- |
| Bucket scan | Retrieve all metadata for all objects in a bucket | This operation can be implemented by issuing a PREFIX-GET on the primary index using the prefix "<tenant id>.<bucket id>" and then retrieving the resulting list of object metadata from storage devices. |
| Index Seek | Retrieve cached metadata for objects satisfying given criteria for a named secondary index | Issue a PREFIX-GET on the secondary index using the prefix "<tenant id>.<bucket id>.<index name>.<criteria key>.<criteria value>" |
| Object retrieval | Retrieve all metadata for a single object by its object key | This operation can be implemented by issuing a GET operation on the primary index to determine the object location, and then retrieving the object's metadata using that location |
| Predicate evaluation | Evaluate a given predicate against a stream of object metadata | Any suitable comparison routines can be used, such as string comparison routines and numeric comparators |
| Project | Reduce a stream of object metadata to a given set of metadata keys. In this context, metadata may include object ids. | Any suitable mapping technique can be used |
| Sort | Sort a stream of object metadata using one or more given metadata keys | Any suitable sorting technique can be used, such as Quicksort with an alphanumeric comparator |

Figure 5:
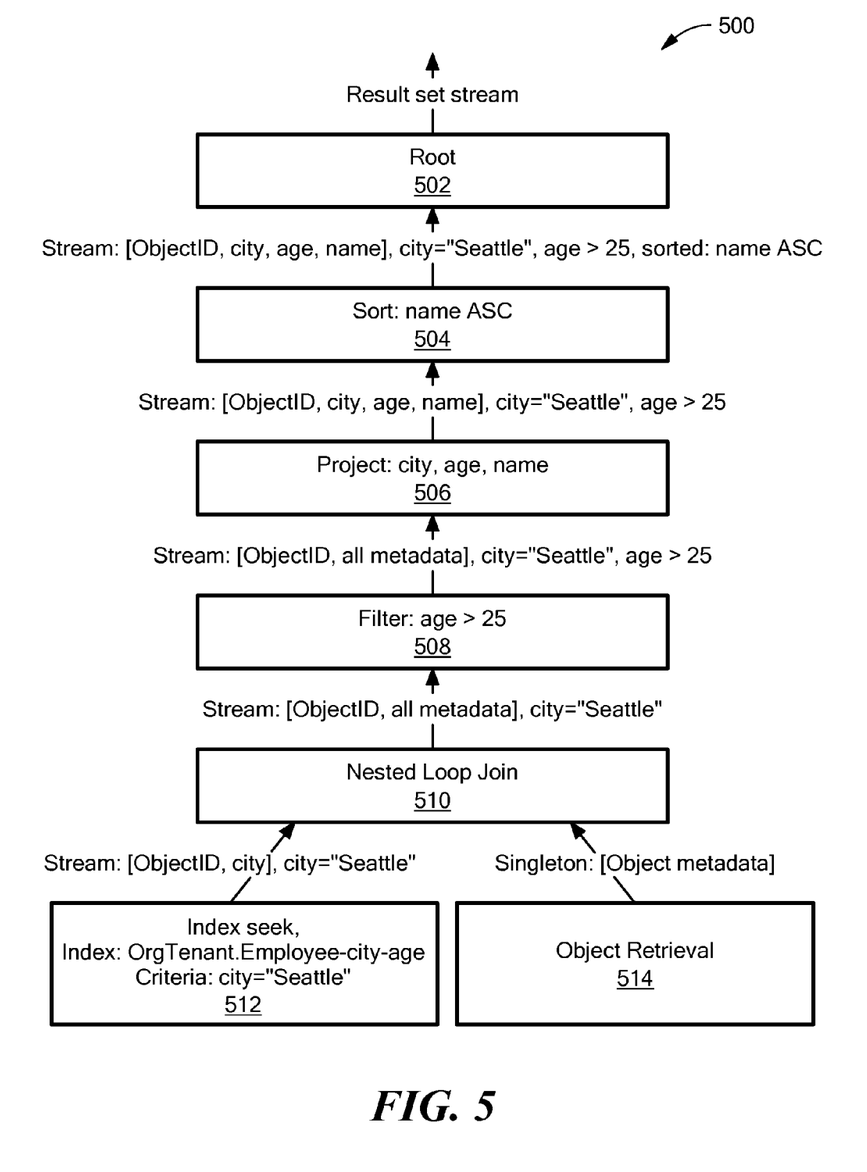
FIG. 5 is a diagram of an illustrative physical query plan corresponding to the logical query plan of FIG. 4.

As an example, FIG. 5 illustrates one possible physical query plan 500 that can be derived from the logical query plan 400 of FIG. 4. In the following discussion it is assumed that the "employee-city-age" secondary index has been created within the "Employee" bucket, as shown in TABLE 1.

The physical query plan 500 includes a root node 502 and physical operator nodes 504-514. At a high level, the illustrative query plan 500 uses the secondary index named "employee-city-age" to retrieve only those objects satisfying the predicate "city=Seattle," and subsequently filters the objects by "age" and sorts them by "name." This strategy may be desirable if a relatively small percentage of employees satisfy the criteria "city=Seattle" because it would reduce the number of objects retrieved. An alternate query plan could use a different secondary index (not described here) that organizes metadata records in 314 based on "age" to retrieve only the employee objects within a certain age range.

In some embodiments, the key-value store (and, thus, the secondary index table 314) maintains keys in sorted order (e.g., alphanumeric order). Accordingly, another physical query plan could perform a PREFIX-GET on the key-value store using the prefix "OrgTenant.Employee.name" to retrieve employees sorted by name, and subsequently filter by name and age. The last strategy requires all objects in the bucket to be retrieved, but avoids a subsequent sort step.

The candidate physical query plans, generated for all logical query plans, are evaluated based on a cost model to determine the least cost (or "best") alternative. A physical query plan can be associated with a cost, which estimates of the time and/or processing resources that may be required to execute that plan. Although the costs are only estimates that do not necessarily reflect the reality of executing the query against the real data in the bucket, utilizing a cost model allows the query optimizer 308 to perform a "best effort" comparison of different plans.

To cost a physical query plan, each node is assigned a cost based on its corresponding physical operation, wherein the cost of the query plan's root node is the aggregate cost of the entire query plan. To cost a physical operation, the query optimizer 308 can use a combination of heuristics along with statistical/historical information. For example, the object store 304 could maintain statistics about the number of objects the bucket; the average object metadata size; the number of blocks required to store the bucket; the blocking factor of the bucket (i.e., the number of object metadata entries that fit into one block); the number of distinctive metadata keys; the number of distinctive metadata values for a given key; the minimum and maximum possible values for a given metadata key; the selectivity of a metadata key, which is the fraction of objects satisfying an equality condition on the metadata key; and the selection cardinality of a given metadata key, which is the average number of objects whose metadata satisfies an equality condition on that key. Any suitable combination of these various statistics could be used to estimate a cost for a given physical operation.

An example heuristic is to use statistics on the distribution of data based on certain metadata keys, for example keys in a secondary index. At some additional cost to insert, update and delete operations on objects, statistics could be kept to say how many objects have the value of age in particular buckets (e.g., 0-10, 10-20, 20-30, etc.) these statistics could suggest if the secondary index would be likely to be more efficient than a bucket scan. Thus, for example, if the statistics indicated that 95% of the objects had value of age greater than 25, the secondary index scan would not eliminate many objects from the result set and therefore the bucket scan would be more efficient than using the secondary index. As another example, if the statistics indicated that only 1% of the objects had the city "Seattle," the physical query plan 500 of FIG. 5 is far more efficient relative to performing full bucket scan.

Based upon the cost model evaluation, a physical query plan is selected and submitted to query executor 310 for evaluation. In various embodiments, the plan with the lowest estimated cost is selected. It will be understood that the set of alternative query plans could be quite large and, thus, generating and evaluating all alternative plans can be cost prohibitive. Accordingly, in some embodiments, the query optimizer 308 balances the cost (in time and resources) of determining a "best" query plan versus the savings (in time and resources) of executing the "best" plan compared to a plan that may initially be considered less efficient.

The query executor 310 traverses the selected physical query plan from the leaf nodes up to the root node, generating intermediate results for inner nodes (i.e., non-leaf, non-root nodes). The final result set of the query is generated by evaluating the root node of the selected query plan. In some embodiments, the results of executing a node is a stream of tuples, wherein each tuple includes an object id and/or object metadata for a given object. For example, if a node includes predicate evaluation (e.g., "Filter"), the output of the node is a stream of tuples for which the predicate evaluated to true. Thus, using pipelining, node execution includes consuming an input stream of tuples and evaluating those tuples in some fashion to produce an output stream. Certain operations (e.g., predicate evaluation and project) can commence without having access to the entire input stream and, thus, pipelining techniques known in the art can be applied thereto. Other operations, such as sort, require access to the entire input stream before processing can begin.

In some embodiments, the query executor 310 performs pagination. The pagination parameters can be explicitly specified by a client, or could be defaults within the object storage system. For example, following the S3 API, a client could specify "max-keys" and "marker" parameters within certain REST operations, which specify that maximum number of results to be returned and an lexicographical starting point for returned object ids, respectively. Using these parameters, it will be appreciated that a client can iteratively retrieve a large result set in relatively small batches.

As an example of query executor 310 processing, consider the illustrative physical query plan of FIG. 5 (which may correspond to the query of TABLE 4). The query executor 310 begins by processing leaf node 512, where an index seek operation is performed using the secondary index on "city" to produce a stream of [ObjectID, city]. The tuples could also include any cached metadata properties defined on this index. More specifically, the query executor 310 would do a PREFIX-GET on the secondary index table 314 using the prefix "OrgTenant.Employee.city.Seattle" to retrieve key-value pairs and to generate the stream of tuples therefrom. This stream can be processed via node 510, which iterates through the tuples on the input stream from node 512 and performs an object retrieval operation (node 514) for each object id in the stream. The retrieved objects and "joined" with the stream to generate a stream of [ObjectID, all metadata] tuples (where "all metadata" refers to the list of all metadata properties defined on an object). It should be appreciated that, by taking advantage of the secondary index on "city," only a subset of objects in the bucket need to be retrieved, which could greatly improve efficiency and performance.

At node 505, the query executor 310 filters the stream of tuples using the predicate "age>25." At node 506, the query executor 310 performs a projection, narrowing the tuples from [ObjectID, all metadata] to [ObjectID, city, age, name]. At node 504, the query executor 310 sorts the stream by "name" in ascending ("ASC") order. Next, the query executor 310 performs processing associated with the root node 502. For example, if explicitly/default pagination parameters are given, the query executor 310 could apply pagination by skipping input tuples until the "marker" object id is found and limiting the output stream to "max-keys" tuples. The output of the root node 502 is referred to herein as the "result set stream."

The results formatter 312 prepares the result set stream into a suitable format for responding to the client 102. In some embodiments, the results formatter 312 generates a "list bucket response," which is a specified in the S3 API. For example, TABLE 6 shows portions of an illustrative XML-encoded list bucket response that could correspond to the query of TABLE 4. It will be appreciated that the response is the same as a standard list bucket response, but includes only a subset of objects in the bucket that satisfy the query. Thus, the client can specify the response format (XML in TABLE 4, although JSON, CSV, plain text, etc. could also be specified) using the Content-Type HTTP request header, can authenticate itself using standard user authentication headers, can control pagination using the "max-keys" and "marker" parameters, etc. For each object matching the query, the response includes an object id, the object data size, and a list of projected attributes. In some embodiments, the response could include a URL for each object, indicating the location from which the object data can be retrieved (i.e., "downloaded") by the client.

TABLE 6

List Bucket Response Example

```
<ListBucketResult . . .>
    <Name>Employee</Name>
    <Prefix/>
    <Marker/>
    <MaxKeys>1000</MaxKeys>
    <IsTruncated>false</IsTruncated>
    <Contents>
        <ObjectID>Emp-6654-image.jpg</ObjectID>
```

TABLE 6-continued

List Bucket Response Example

```
    <city>Seattle</city>
    <age>26</age>
    <name>Alice</name>
  </Contents>
  <Contents>
    <ObjectID>Emp-2290-image.jpg</ObjectId>
    <city>Seattle</city>
    <age>29</age>
    <name>Bob</name>
  </Contents>
</ListBucketResult>
```

It will be appreciated that with query planning, secondary indexing, and other optimization techniques, object retrieval using the systems and techniques disclosed herein may be far more efficient than a simple list of all objects in a bucket and predicate evaluation against each object. Moreover, because the query language embodiments disclosed herein (i.e., "OSQL") are declarative, meaning that the client specifies what is to be queried but not how, the systems and techniques can be improved over time without change to clients.

Figure 6:
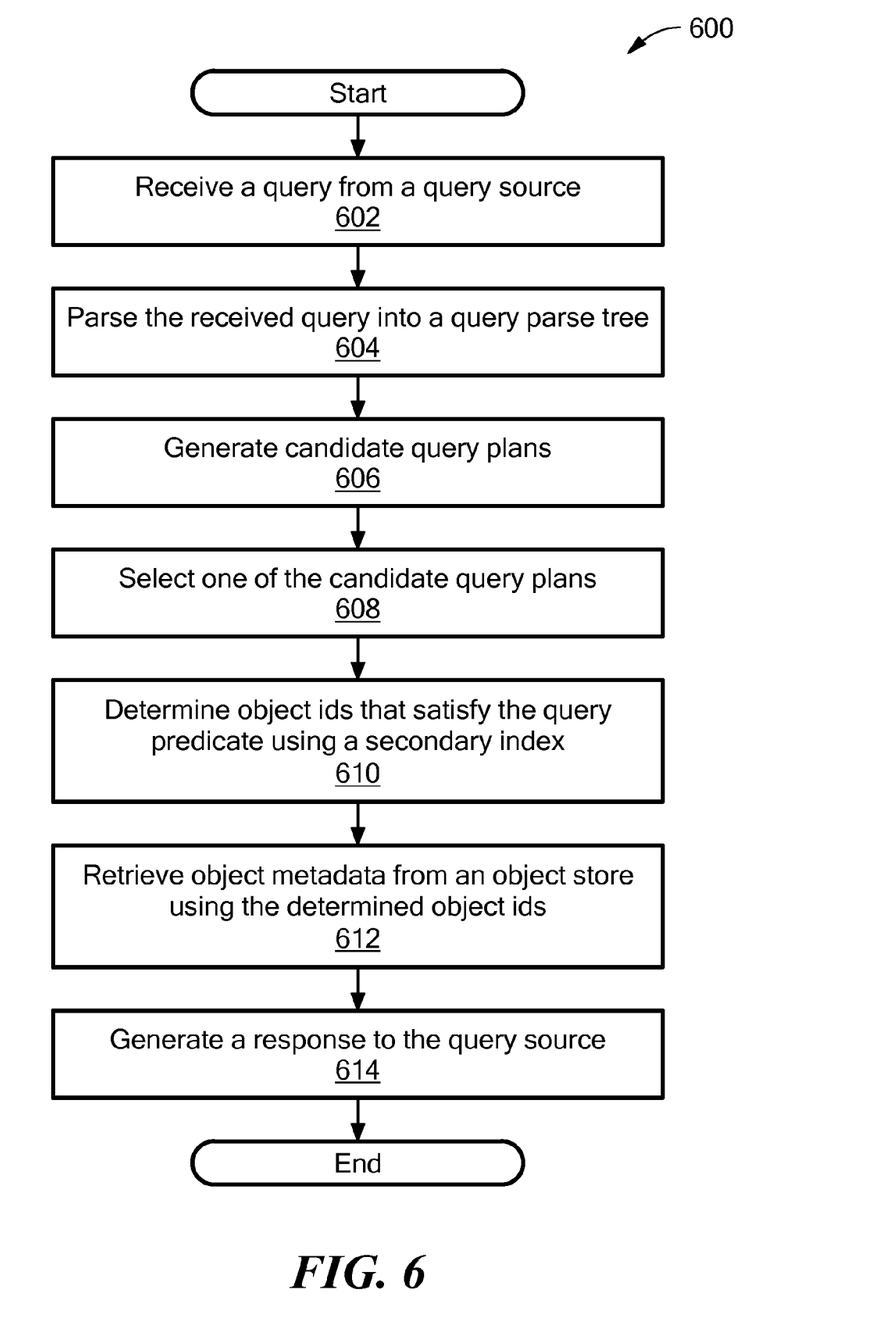
FIG. 6 is a flowchart illustrating a method for use with the systems of FIGS. 1-3.

FIG. 6 is a flowchart corresponding to the below contemplated technique which would be implemented in the object storage system 104 (FIG. 1) and/or the query service 300 (FIG. 3). Rectangular elements (typified by element 602), herein denoted "processing blocks," represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

At block 602, a query is received from a query source (e.g., a query source 302 of FIG. 3). The received query is associated with a bucket id and includes a predicate involving an object metadata key. At block 604, the query is parsed into a query parse tree and, at block 606, one or more candidate query plans are generated based upon the query parse tree. The candidate query plans may physical query plans derived from logical query plans. At block 608, one of the candidate query plans is selected for execution (e.g., using a cost model). At block 610, object ids that satisfy the query predicate are determined using a secondary index (e.g., secondary index table 314 in FIG. 3). At block 612, object metadata is received from an object store using the determined object ids. For certain query plans, the metadata may be "joined" with the object ids to produce a stream of tuples, which may be subsequently filtered, projected, sorted, etc. At block 614, a response to the query source formed based upon the processed stream of tuples.

Figure 7:
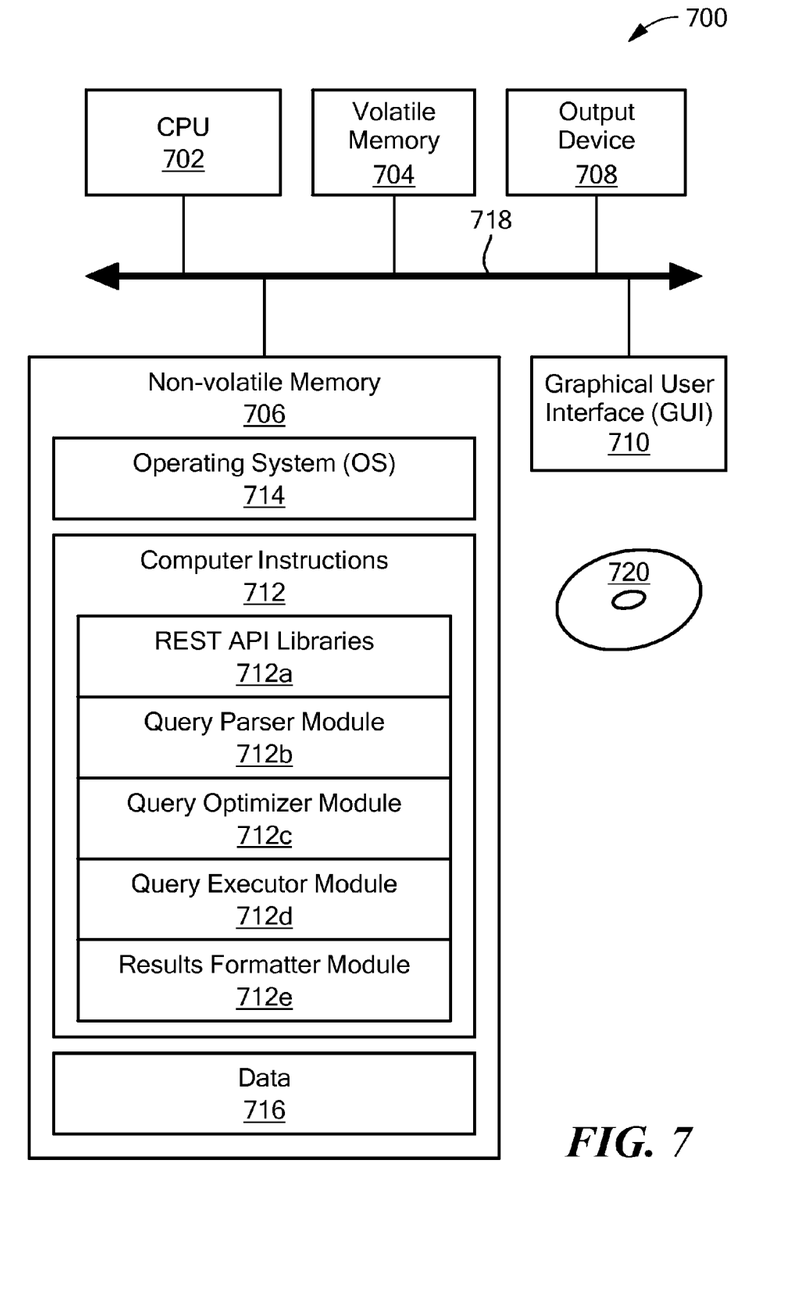
FIG. 7 is a schematic representation of an illustrative computer for use with the systems and methods of FIGS. 1-3 and 6.

FIG. 7 shows an illustrative computer or other processing device 700 that can perform at least part of the processing described herein. The computer 700 includes a processor 702, a volatile memory 704, a non-volatile memory 706 (e.g., hard disk), an output device 708 and a graphical user interface (GUI) 710 (e.g., a mouse, a keyboard, a display, for example), each of which is coupled together by a bus 718. The non-volatile memory 706 stores computer instructions 712, an operating system 714, and data 716. In one example, the computer instructions 712 are executed by the processor 702 out of volatile memory 704. In one embodiment, an article 720 comprises non-transitory computer-readable instructions.

In certain embodiments, the computer instructions 712 include one or more REST API libraries 712a, query parser module instructions 712b, query optimizer module instructions 712c, query executor module instructions 712d, and/or results formatter module instructions 712e.

Processing may be implemented in hardware, software, or a combination of the two. In embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that that scope of protection sought herein should not be limited to the described embodiments but rather should be limited only by the spirit and scope of the following claims.

What is claimed is:

1. A system comprising:
   an object store to store a plurality of objects and corresponding object metadata properties within storage devices, each of the objects having an object id and being associated with a bucket, each of the metadata properties having a key and an corresponding value;
   a secondary index to map ones of the object metadata properties to ones of the object ids;
   a query parser to receive a query from a query source and to parse the received query into a query parse tree, the received query having a bucket id identifying a bucket within the object store and having a predicate involving one of the object metadata keys;
   a query executor to determine ones of the object ids from the secondary index using the bucket id and the object metadata keys involved in the query predicate, and to retrieve ones of the object metadata properties from the object store using the determined object ids to generate a query result set stream; and
   a query formatter to generate a response to the query source based upon the query result set stream.

2. The system of claim 1 further comprising a query optimizer to generate candidate query plans, to evaluate the candidate query plans based upon a cost model, and to select one of the candidate query plans based upon the cost model evaluation, each of the candidate query plans being semantically equivalent to the received query.

3. The system of claim 2 wherein the query optimizer generates at least one logical query plan according to the received query, and generates a plurality of physical query plans according to the logical query plan, wherein the selected query plan corresponds to one of the plurality of physical query plans.

4. The system of claim 3 wherein the selected query plan comprises a tree representation, wherein nodes of the tree representation correspond to operations, wherein the query executor executes the selected query plan by traversing the nodes of the tree representation and executing the corresponding operations.

5. The system of claim 2 wherein the secondary index comprises a distributed key-value store.

6. The system of claim 5 wherein the cost model utilizes statistical information about the secondary index computed from the distributed key-value store.

7. The system of claim 1 further comprising a request processor to receive an updated object and object metadata properties, to write the updated object and object metadata properties to the object store, and to update the secondary index based upon the updated object metadata properties.

8. The system of claim 7 wherein the object store and the secondary index are updated atomically.

9. A method comprising:
   receiving a query from a query source, the received query having a bucket id identifying a bucket within an object store and having a predicate involving an object metadata key;
   parsing the received query into a query parse tree;
   generating candidate query plans, each of the candidate query plans being semantically equivalent to the received query;
   selecting one of candidate query plans;
   determining object ids that satisfy the query predicate by retrieving object ids from a secondary index using the bucket id and the object metadata keys involved in the query predicate;
   retrieving a plurality of object metadata from the object store using the determined object ids; and
   generating a response to the query source based upon the object ids and object metadata.

10. The method of claim 9 wherein selecting one of candidate query plans comprises:
    evaluating the candidate query plans based upon a cost model; and
    selecting one of candidate query plans based upon the cost model evaluation.

11. The method of claim 10 wherein generating candidate query plans includes:
    generating at least one logical query plans according to the received query; and
    generating a plurality of physical query plans according to the logical query plan, wherein the selected query plan corresponds to one of the plurality of physical query plans.

12. The method of claim 11 wherein generating a plurality of physical query plans comprises generating a tree representation, wherein nodes of the tree representation correspond to operations, the method further comprising traversing the nodes of the tree representation and executing the corresponding operations.

13. The method of claim 10 wherein retrieving object ids from a secondary index comprising retrieving rows from a distributed key-value store using the bucket id and the object metadata keys involved in the query predicate.

14. The method of claim 13 wherein evaluating the candidate query plans based upon a cost model comprises utilizing statistical information about the secondary index computed from the distributed key-value store.

15. The method of claim 9 further comprising:
    receiving a request to store updated object and object metadata properties;
    writing the updated object and object metadata properties to the object store; and
    updating the secondary index based upon the updated object metadata properties.

16. The method of claim 15 wherein the object store and the secondary index are updated atomically.

* * * * *